United States Patent [19]
Drew

[11] Patent Number: 5,407,481
[45] Date of Patent: * Apr. 18, 1995

[54] FLOWABLE, PRESSURE-COMPENSATING MATERIALS

[75] Inventor: Terrence M. Drew, Boulder, Colo.

[73] Assignee: Alden Laboratories, Inc., Boulder, Colo.

[*] Notice: The portion of the term of this patent subsequent to Mar. 3, 2009 has been disclaimed.

[21] Appl. No.: 49,932

[22] Filed: Apr. 20, 1993

Related U.S. Application Data

[63] Continuation-in-part of Ser. No. 844,518, Mar. 2, 1992, Pat. No. 5,204,154, which is a continuation-in-part of Ser. No. 410,610, Sep. 21, 1989, Pat. No. 5,100,712, and a continuation-in-part of Ser. No. 573,452, Aug. 27, 1990, Pat. No. 5,093,138.

[51] Int. Cl.$^6$ .................. C04B 14/04; C04B 14/10
[52] U.S. Cl. ............................ 106/672; 106/122; 106/285; 106/287.16; 106/287.26; 106/287.34; 106/486; 106/811; 106/812; 106/817; 106/822; 252/601; 428/403
[58] Field of Search ............. 106/486, 822, 672, 122, 106/15.05, 18.11, 18.12, 18.13, 18.14, 18.24, 811, 812, 817, 285, 287.26, 287.16, 287.34; 428/403, 404, 407, 921, 405, 406; 252/601

[56] References Cited

U.S. PATENT DOCUMENTS

| | | | |
|---|---|---|---|
| 2,760,281 | 8/1956 | Cosin | 36/71 |
| 2,885,360 | 5/1959 | Haden, Jr. et al. | 252/28 |
| 3,237,319 | 3/1966 | Hanson | 36/2.5 |
| 3,308,491 | 3/1966 | Spence | 5/450 |
| 3,402,411 | 9/1966 | Hanson | 12/142 |
| 3,407,406 | 10/1968 | Werner et al. | 2/3 |
| 3,449,844 | 6/1969 | Spence | 36/44 |
| 3,548,420 | 12/1970 | Spence | 3/20 |
| 3,635,849 | 1/1972 | Hanson | 260/2.5 |
| 3,663,973 | 5/1972 | Spence | 5/348 |
| 3,810,265 | 5/1974 | McGrew | 5/450 |
| 3,862,044 | 1/1975 | Christopher et al. | 252/8.55 |
| 4,019,209 | 4/1977 | Spence | 3/36 |
| 4,038,762 | 8/1977 | Swan, Jr. | 36/89 |
| 4,083,127 | 4/1978 | Hanson | 36/93 |
| 4,108,928 | 8/1978 | Swan, Jr. | 264/26 |
| 4,144,658 | 3/1979 | Swan, Jr. | 36/71 |
| 4,229,546 | 10/1980 | Swan, Jr. | 521/55 |
| 4,243,754 | 1/1981 | Swan, Jr. | 521/55 |
| 4,255,202 | 3/1981 | Swan, Jr. | 106/112 |
| 4,380,569 | 4/1983 | Shaw | 428/283 |
| 4,456,642 | 6/1984 | Burgdorfer et al. | 428/68 |
| 4,534,797 | 8/1985 | Habib | 604/336 |
| 4,578,065 | 3/1986 | Habib | 604/336 |
| 4,664,909 | 5/1987 | Marschner | 424/65 |
| 4,668,564 | 5/1987 | Orchard | 428/246 |
| 4,748,978 | 6/1988 | Kamp | 128/156 |
| 4,793,402 | 12/1988 | Yano et al. | 165/10 |
| 5,093,138 | 3/1992 | Drew et al. | 428/76 |
| 5,100,712 | 3/1992 | Drew et al. | 428/68 |
| 5,131,174 | 7/1992 | Drew et al. | 36/35 |
| 5,204,154 | 4/1993 | Drew et al. | 428/68 |

FOREIGN PATENT DOCUMENTS 0045185 3/1986 European Pat. Off. .

OTHER PUBLICATIONS

"The Mechanisms of Thickening by Inorganic Agents" by James A. Polon, B.S., Journal of the Society of Cosmetic Chemists, 21, 347–363 (May 27, 1970).

"Bentone Baragel Nykon Rheological Additives: Organoclay Gellants for the Lubrication Industry" by Rheox, Inc. PB 150 MU Oct. 1982, pp. 1–16.

(List continued on next page.)

Primary Examiner—anthony Green
Attorney, Agent, or Firm—Sheridan Ross & McIntosh

[57] ABSTRACT

Flowable, pressure-compensating material compositions are provided. The compositions are directed toward improving one or more aspects of the flowable material, such as by providing/improving flame retardancy and/or the homogeneity of the composition over time. For instance, one composition includes a liquid, a viscosity-increasing material, and beads having a preselected coating thereon to provide for a coupling interaction with at least one of the liquid and the viscosity-increasing material.

34 Claims, 1 Drawing Sheet

OTHER PUBLICATIONS

"Baragel ®3000 Rheological Additive for Lubricating Grease Manufacture" by Rheox, Inc., DS–528, Jun. 1992.

"Self–Activating Baragel ®3000/Nykon ®3000 Grease Gellants" by Rheox, Inc., PB–171 MGS Oct. 1987.

"Clay Based Grease" by Murray D. Kieke of Rheox, Inc., Presented at th NLGI Grease Education Course Oct. 28–31, 1990, Denver, Co. (no month).

"Attagel 40 and 50 Thickeners/Suspending Agents in Aqueous Systems Usage Handbook" by Engelhard Exceptional Technologies, TI–1054 EC–5549P (no date).

"Attapulgite Specialty Thickeners and Sorbents" by Engelhard Exceptional Technologies, TI–1002 EC–1438, Rev. Jul. 1987.

"Rheology Handbook a Practical Guide to Rheological Additives" by Rheox, Inc., pp. 3–36 (no date).

"Additives for CAB–O–SIL Fumed Silica," Jun. 1987.

"Aqualon (TM) Celluose Gum, Sodium Carboxymethylcellulose", Physical and Chemical Properties, copyright 1988.

"Natrosol (TM), Hydroxyethylcellulose, A Non–Ionic Water–Soluble Polymer", Physical and Chemical Properties, Revised Jul. 1987.

FLOWABLE, PRESSURE-COMPENSATING MATERIALS

This application is a continuation-in-part of application Ser. No. 07/844,518, filed on Mar. 2, 1992, now U.S. Pat. No. 5,204,154, which is a continuation-in-part of application Ser. No. 07/410,610, filed on Sep. 21, 1989, now U.S. Pat. No. 5,100,712, and application Ser. No. 07/573,452, filed on Aug. 27, 1990, now U.S. Pat. No. 5,093,138, all of which are incorporated herein by reference in their entirety.

FIELD OF THE INVENTION

This invention relates generally to the field of flowable materials and, more particularly, to flowable, pressure-compensating materials for human anatomy padding applications.

BACKGROUND OF THE INVENTION

Various padding devices have been employed in the past. Examples include liquid- or gas-filled bladders, e.g., water-filled cushions and pneumatic pads; and gases or liquids dispersed in a solid material, e.g., foams and gels. Generally, such padding devices operate on the principle of conformation to the shape of an object when placed under pressure. When a force, such as a person's mass, is placed on such a padding device, the device deforms so as to conform to the shape of the pressure-applying object in order to distribute the force over as large an area as possible. These devices perform adequately when the object being padded has a relatively large, uniformly shaped surface area. However, when the object being padded includes a relatively small area of concentrated force, such as that caused by a bony protuberance, the majority of known padding devices do not perform to adequately reduce the discomfort of users in many applications. This is because such padding devices exert greater responsive pressure on the area of concentrated force.

The reason for the greater pressure is that materials employed in prior art padding devices typically have a high degree of "memory." As used herein, the term "memory" will refer to that characteristic of a material in which the material returns to its original shape as a result of internal restoring forces when an external force is removed. Such materials deform to the shape of an object which applies an external force by compressing. However, due to the internal restoring forces, a pressure which is proportional to the degree of compression is exerted against the object which applies the external force. A sharp protuberance compresses the padding device more than the surrounding areas and, as a result, the padding device presses back with greater pressure in these areas of high compression. Such areas of high pressure are especially undesirable when the protuberance is a bone, such as an ankle or ischial tuberosity. The high pressure can lead to discomfort and, after periods of extended use, to actual damage to the tissue overlying the protruding bone.

The problem can be described with reference to a padding device comprising a gas dispersed in a solid material, e.g., foam. Tiny gas bubbles in foam act like millions of coil "springs." When an irregularly shaped object, such as a human body portion, exerts a force on the foam padding device, the "springs" are compressed to varying degrees, each pushing back on the body portion with a force proportional to the amount of compression. This produces differential pressures across the body portion coinciding with the padding device which in and of itself causes a certain degree of discomfort. In order to achieve intimate conformity with the human body portion, a relatively soft foam may be utilized, which can be compared to weak "springs." However, when bony protuberances exert a concentrated force on these soft foams the "springs" are greatly compressed and thus, exert larger forces against the coinciding body portion, thereby possibly causing pain and reduced circulation. Moreover, if the foam is too soft there may be total compression and thus a bottoming out effect such that the foam actually provides little or no padding in these areas. The problem exists and is even more pronounced if a stiffer foam is employed, because the "springs" are stronger and thus the forces applied back against the human body portion will be greater, particularly in areas coinciding with bony protuberance. Intimate conformity is also more difficult to achieve with stiffer foams.

Deformable silicone gel padding devices are disclosed in U.S. Pat. No. 3,449,844 by Spence, issued Jun. 17, 1969; U.S. Pat. No. 4,380,569 by Shaw, issued Apr. 19, 1983; U.S. Pat. No. 3,663,973 by Spence, issued May 23, 1972; U.S. Pat. No. 3,548,420 by Spence, issued Dec. 22, 1970; U.S. Pat. No. 3,308,491 by Spence, issued Mar. 14, 1967; U.S. Pat. No. 4,019,209 by Spence issued Apr. 26, 1977; and U.S. Pat. No. 4,668,564 by Orchard, issued May 26, 1987. In U.S. Pat. No. 4,380,569, a silicone gel containing glass microbeads is disclosed.

The silicone gel disclosed in these patents, being a cross-linked and extended chain polymer, is described as having near total memory. In other words, it returns to its original shape when an external force is removed. The internal restoring forces necessary to provide such memory are undesirable in some applications. In use, differential pressures will result depending upon the degree of deformation of the silicone gel material, with higher deformation resulting in localized areas of high pressure being exerted on the external pressure-applying object.

In order to alleviate the problem of differential pressure inherent with many prior art materials, flowable, pressure-compensating materials were developed. Such materials and applications thereof are described in U.S. Pat. No. 3,402,411 by Alden Hanson, issued Sep. 24, 1968; U.S. Pat. No. 3,635,849 by Alden Hanson, issued Jan. 18, 1972; U.S. Pat. No. 4,038,762 by Swan, Jr., issued Aug. 2, 1977; U.S. Pat. No. 4,083,127 by Chris Hanson, issued Apr. 11, 1978; U.S. Pat. No. 4,108,928 by Swan, Jr., issued Aug. 22, 1978; U.S. Pat. No. 4,144,658 by Swan, Jr., issued Mar. 20, 1979; U.S. Pat. No. 4,229,546 by Swan, Jr., issued Oct. 21, 1980; and U.S. Pat. No. 4,243,754 by Swan, Jr., issued Jan. 6, 1981. Each of these U.S. patents is incorporated herein by reference in its entirety. These patents will collectively be referred to as the "flowable, pressure-compensating material patents."

The preferred materials disclosed in U.S. Pat. No. 3,402,411 comprise from 20 to 25 weight percent polyisobutylene, from 25 to 37.5 weight percent of an inert oil, e.g. mineral oil or a saturated ester oil or a mixture thereof, and from 42.5 to 50 weight percent inorganic filler. U.S. Pat. No. 3,635,849 discloses a composition consisting essentially of from about 5 to about 45 weight percent of a polyolefin, particularly polyisobutylene, from about 15 to about 70 weight percent of a paraffin, and from about 5 to about 80 weight percent oil. Lightweight aggregate materials, for example, polystyrene beads or a heavy aggregate such as $Fe_3O_4$ can also be added.

The flowable, pressure-compensating materials disclosed in U.S. Patent Nos. 4,038,762, 4,108,928 and 4,243,754 include from 21.39 to 77.96 weight percent oil, 21.04 to 69.62 weight percent wax and 1 to 9 weight percent microbeads. U.S. Patent Nos. 4,144,658 and 4,229,546 disclose flowable, pressure-compensating materials comprising 10 to 60 weight percent hollow, glass microbeads, 8.5 to 34 weight percent wax and 26.5 to 81 weight percent oil. U.S. Pat. No. 4,083,127 discloses a flowable, pressure-compensating fitting material consisting essentially of discrete, lightweight, sturdy microbeads distributed throughout a continuous phase of wax and oil.

In use, the flowable, pressure-compensating materials disclosed in the above-mentioned patents are typically placed in a pliable package or envelope to define a padding device, such as by injecting the flowable material between two leak-proof resinous sheets which are sealed at the edges. The flowable materials act hydraulically. For instance, in applications where the force being transferred to the padding device is substantially constant (e.g., a seat cushion), flowable material in the region of the padding device coinciding with the applied force attempts to flow to other regions within the padding device away from the applied force (e.g., the flowable material is redistributed throughout the padding device to effectively equalize the pressure therewithin). Preferably, there is not a total evacuation of flowable material from the region coinciding with the applied force so that the user does not "bottom out" on the padding device and thereby experience a high force concentration and related discomfort. As a result of this migration of flowable material throughout the padding device, the applied force is distributed over a larger area, thereby reducing the pressure experienced by the user and relatedly enhancing user comfort (e.g., differential pressures throughout the padding device may be minimized by the transfer of flowable material throughout at least portions of the padding device). As can be appreciated, the larger the area over which the force can be distributed by having the padding device substantially conform to the user, through the described migration of flowable material and/or based upon a preconfigured/precontoured padding device, pressures experienced by the user on the padding device can be minimized.

Depending upon the particular padding application, the viscosity of the flowable materials can be varied to provide certain desired performance characteristics. For instance, in applications where the force applied to the padding device is more repetitive or cyclic in nature, such as in the self-reinitializing padding device disclosed in U.S. Pat. No. 5,131,174 by Drew et al., issued Jul. 21, 1992, lower viscosity flowable materials may be preferable. However, in the those padding applications in which the force is somewhat constant as described above and/or in applications where stability is an issue (e.g., where it is desirable to have the flowable material migrate/flow only when exposed to continually applied, versus instantaneously applied forces) higher viscosity materials may be used. However, increasing the viscosity of the flowable material does not decrease the ability of the flowable materials to conform to the shape of the force-applying object, only the rate at which they will migrate within the padding device, such as to achieve substantial conformance with the user to maximize force distribution. Consequently, by using high viscosity flowable materials the "reaction" or "response time" of the flowable material may be reduced, which again may be desirable for certain applications. Flowable materials are presently marketed under the trademark FLOLITE TM by Alden Laboratories, Inc. of Boulder, Colo. U.S.A.

In many if not all padding applications which utilize flowable materials of the above-described type, it is generally desirable to retain a certain distribution of the various constituents throughout the flowable material (e.g., a homogeneous mixture). One particular constituent which may have a tendency to separate from remaining portions of the flowable material composition are beads, such as when the beads are substantially hollow to, inter alia, reduce the weight of the flowable material composition and thus the weight of the padding device. In order to redistribute the beads in the flowable material composition, the padding device may be kneaded. Notwithstanding the commercial success of existing flowable material compositions in padding applications, such as in wheelchair seat cushions, it can be appreciated that further reduction of kneading requirements/periodicity will further enhance the potential for commercial success of these types of padding devices.

Flammability of the flowable material composition may also affect the extent of its commercial success in extending the use of flowable materials to additional padding applications. For instance, in the event that flowable material compositions are used in airplane and/or motor vehicle seat cushions, the potential exists that the padding device will be exposed to a relatively high heat source in the case of an accident. Moreover, there may be applications where there is an elevated temperature during normal use of the padding device. In order to make flowable materials commercially viable for these types of applications, it would be desirable for the flowable material and/or the envelope containing such flowable material to have a certain degree of flame retardancy.

SUMMARY OF THE INVENTION

The present invention generally relates to improvements of flowable, pressure-compensating materials used in fluid-tight enclosures for human anatomy padding applications. More particularly, the compositions of flowable materials in accordance with the present invention exhibit further reductions in the degree of separation of individual constituents over time and/or exhibit desired flame retardancy characteristics.

One composition of a flowable material in accordance with the present invention includes a liquid, a viscosity-increasing material, and plurality of beads (e.g., substantially small, hollow or solid particles for influencing the flow characteristics of the composition, for enhancing load distribution, and/or for reducing the weight of the composition) having a preselected coating on an exterior surface thereof and a density which is different (e.g., less) than that of both the liquid and viscosity-increasing material. Based upon the relative densities of these constituents, the potential exists that the beads may float/settle out of the composition which may undesirably affect the characteristics/performance of the flowable material. As used herein, the terms "float/floating out" "settle/settling out" mean a condition in which a particular constituent is not distributed throughout the flowable material to an acceptable degree, such as when beads migrate/collect at or near the "surface" of the flowable material. Therefore, in order to retain the beads within the composition for an acceptable period of time, the coating on the beads is selected to provide for an interaction/coupling effect with at least one of the liquid or the viscosity-increasing material.

Appropriate viscosity-increasing materials for the above-described flowable material composition includes various clays (e.g., attapulgites and/or bentonites), fumed silica, and mixtures thereof; appropriate liquids include oil (e.g., mineral oils such as petroleum-derived oils and including where such liquid is all oil or combinations of oil and other materials such as wax), glycerin-containing solutions (e.g., all glycerin solutions or solutions containing a combination of glycerin and water), and polyhydroxyl alcohol solutions; and appropriate beads include those which are formed from resinous materials (e.g., acrylonitrile or polyvinylidene dichloride beads which each have a calcium carbonate coating thereon). Various combinations of these particular constituents have yielded desired results.

One such combination of the above-identified constituents includes a glycerin-containing solution, attapulgite, and resinous beads having a calcium carbonate coating thereon. Another combination includes oil (e.g., mineral oils such as petroleum-derived oils), fumed silica or surface-treated bentonite, and resinous beads having the calcium carbonate coating thereon. In the case where beads having the calcium carbonate coating thereon are used with certain mineral viscosity-increasing materials and/or with certain liquids, it is believed that the small amount of water on the surface of the beads hydrogen bonds to the mineral viscosity-increasing material (e.g., bentonite surface treated with quarternary ammonium salts) and/or the liquid to retard or substantially prevent the beads from floating out of the composition over a given period of time.

In certain combinations of liquids, viscosity-increasing materials, and beads in accordance with the flowable material compositions of the present invention, it may be desirable to incorporate one or more surfactants for purposes such as increasing the viscosity of the flowable material to a desired degree. For example, appropriate surfactants allow for increased viscosities to be achieved when using attapulgite and/or bentonite clays and/or fumed silica with oil (e.g., petroleum-derived oils), glycerin-containing solutions, and/or polyhydroxyl alcohol solutions. In these cases, the benefits achieved by using the above-described beads having the preselected coating thereon may be extended to flowable material compositions incorporating surfactants as well.

In certain applications in accordance with flowable material compositions of the present invention, it may also be desirable to provide/improve flame retardancy. For instance, various flame retardants may be incorporated into the flowable material composition itself. Moreover, when the flowable material is contained within an envelope for a human anatomy padding application, the flame retardant may be selected to synergistically react with a halogen-containing material forming/defining at least a part of the envelope. Furthermore, a flame retardant cover may be positioned over the flowable material-containing envelope. In any case, flame retardancy is not necessarily dependent upon the type of beads, if any, selected/utilized in the flowable material composition. That is, the flowable material composition which is flame retarded to a certain degree does not necessarily have to include beads. However, certain types of beads may contribute to flame retardancy, such when using halogenous beads (e.g., polyvinylidene-dichloride beads) in combination with synergists such as antimony trioxide.

As noted above, the flowable material compositions are used in human anatomy padding applications. In this case, the improved flowable material compositions of the present invention are contained within a fluid-tight, substantially pliable envelope/enclosure. In order to reduce the potential for the user bottoming out during use of the padding device (i.e., achieving surface-on-surface contact between opposing portions of the envelope/enclosure such that there is no flowable material coinciding with the application of the force to a portion of the human anatomy), the dimensions of the envelope/enclosure and/or the amount of flowable material within the envelope/ enclosure may be appropriately selected.

One composition of an improved flowable material of the present invention suited for the above-described enclosure includes a liquid selected from the group consisting essentially of an oil-containing solution, a glycerin-containing solution, a polyhydroxyl alcohol-containing solution and appropriate mixtures thereof, as well as a viscosity-increasing material selected from the group consisting essentially of attapulgite, fumed silica, bentonite, and mixtures thereof. In addition, a coupling agent is also incorporated within the flowable material composition and is selected from the group consisting essentially of a surfactant, a plurality beads having the predetermined coating thereon such as the type noted above, or a combination thereof. Therefore, the above-identified combinations of constituents for flowable materials may each be incorporated into an enclosure for this human anatomy padding application.

DETAILED DESCRIPTION

Figure 1:
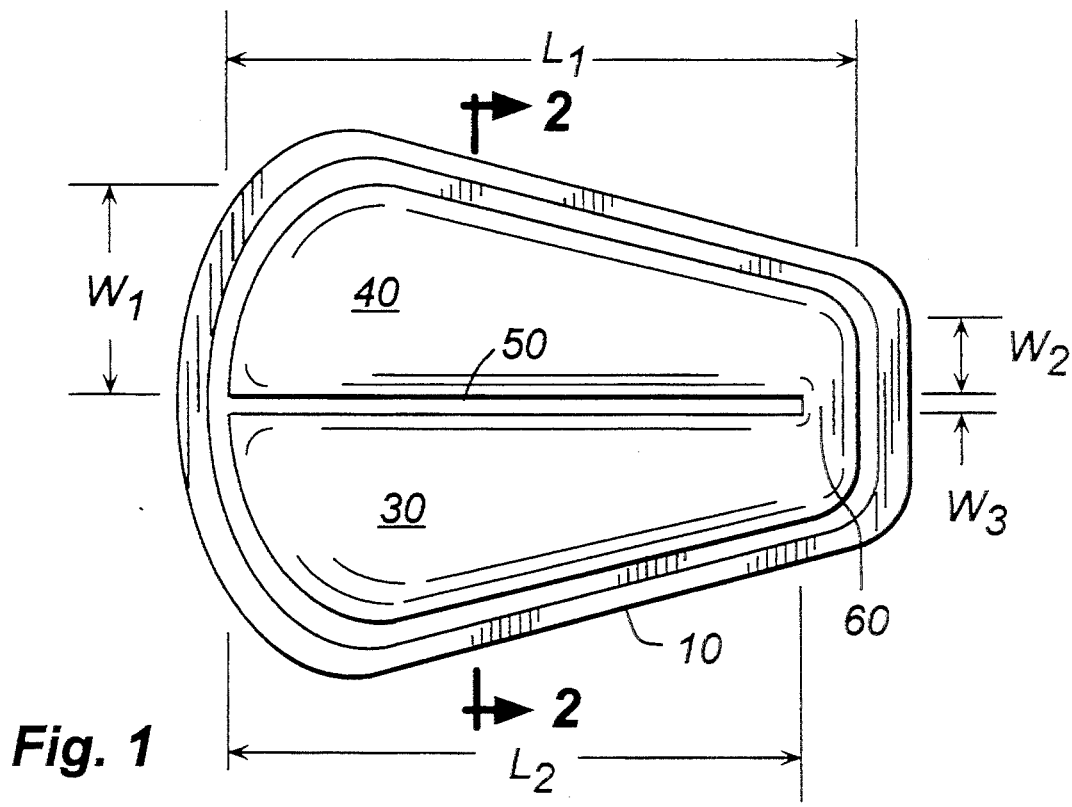
FIG. 1 is a top view of one type of envelope/enclosure for a human anatomy padding application which contains a flowable, pressure-compensating material.

The present invention generally relates to improved compositions of flowable, pressure-compensating materials used in human anatomy padding applications. Compositions of these materials typically include a base liquid, some type of viscosity-increasing material, and beads. A variety of combinations of constituents for such flowable materials are disclosed herein which enhance one or more aspects of the flowable material. More particularly, the various improved compositions of flowable material exhibit further reduction in the degree of separation of individual constituents thereof over time (e.g., the homogeneity of the composition is maintained for an extended period of time) and/or the padding devices incorporating flowable material compositions exhibit a certain degree of flame retardancy (e.g., based upon the flowable material composition having such flame retardancy and/or based upon a synergistic interaction between the flowable material (e.g., using halogenous beads in combination with antimony trioxide) and envelope structure).

One aspect of the present invention relates to flame retardancy. In this regard, certain constituents of flowable materials in accordance with the present invention may be flammable to a certain degree. In order to extend the uses of flowable materials to additional applications, such as in automotive and/or airplane seat cushions as noted above, it may be desirable to provide some degree of flame retardancy (e.g., have the flowable material be non-flammable and/or incorporate flame/smoke suppressants and/or retardants). Generally, one alternative is to incorporate a flame retardant as a constituent of the flowable material. Another alternative is to utilize a base liquid for the flowable material composition which is itself flame retardant (e.g., a brominated phthalate ester such as those marketed under the trademark "Pyronil 45" by Penwalt Corporation, 900 First Avenue, King of Prussia, Pa. 19406-0018, and hexafluoropropylene epoxide polymers such as those marketed under the trademark "Krytox" by Dupont, 1007 Market Street, Wilmington, Del. 19898. Furthermore, in the event that a halogen is incorporated into the enclosure or envelope structure which contains the flowable material for a human anatomy padding application and/or in the event that halogen-containing beads are utilized in the flowable material composition (e.g., polyvinylidene-dichloride beads such as M6001AE beads from Pierce & Stevens Corp. and as further discussed below), a synergistic flame retardant (e.g., antimony oxide, zinc stannate) which "reacts" with the halogen may be selected to provide a desired degree of flame retardancy. In each of the foregoing instances, a certain degree of flame retardancy can also be effected by selecting a flame-retardant enclosure material for containing the flowable material composition (e.g., polyvinyl chloride ("PVC"), polyvinylidene dichloride ("PVDC")). Moreover, a flame retardant cover may be positioned over the flowable material-containing envelope, such as one formed from aramid fibers marketed under the trademark "Nomex".

As noted above, a flame retardant may be incorporated as a constituent of the flowable material. In this regard, flame retardants such as boric oxide ($B_2O_3$), boric acid ($B(OH)_3$), borax ($Na_2B_4O_7.10H_2O$), bicarbonate of soda ($NaHCO_3$), epsom salts ($MgSO_4.7H_2O$), alumina trihydrate ($Al_2O_3 3H_2O$ or $Al(OH)_3$), chloroparaffins, chlorinated polyethylenes, halogens, "Pyronil 45", hydrated calcium carbonate, halogenated fluids (e.g., decabromodiphenyl oxide), or mixtures thereof may be added to the flowable, pressure-compensating material composition. Moreover, phosphonate esters or other char-forming constituents may be utilized.

Bicarbonate of soda and epsom salts are preferred flame retardants for use in certain compositions. Both compounds have the advantage of releasing a non-volatile and non-oxygenating gas or water when heated, thereby smothering flames. For example, epsom salts will release a quantity of steam when heated. Bicarbonate of soda advantageously creates a char by-product when contacted with a flame that also increases flame retardancy, releases carbon dioxide gas when heated, and has low toxicity. Moreover, it has also been found that bicarbonate of soda and epsom salts blend easily and thoroughly with certain compositions.

If boric oxide, boric acid or borax is used as a flame retardant with a pressure-compensating composition containing glycerin, silicone oil, or a wax/oil composition, the flame retardant is preferably added in an amount from about 5 weight percent to about 15 weight percent based on the total composition, more preferably from about 7 weight percent to about 8 weight percent based on the total composition.

If bicarbonate of soda or epsom salt is used as a flame retardant, each is preferably added in an amount from about 5 weight percent to about 30 weight percent, more preferably from about 10 weight percent to about 25 weight percent, most preferably from about 15 weight percent to about 20 weight percent.

The flame retardant can be utilized in flowable, pressure-compensating compositions that contain a flammable material as noted above. Examples of such compositions include wax/oil compositions, silicone oil-containing compositions and glycerin-containing compositions. Each of these compositions may include beads or substantially spherical particles dispersed substantially throughout the composition to influence flow characteristics, reduce weight, and/or provide load-carrying capabilities, as well as preservatives to prevent/inhibit microbiological attack and/or chemical degradation of the flowable material composition.

As used herein, the term "glycerin" refers to the trihydric alcohol having the chemical formula $(CH_2OH)_2CHOH$, which is also commonly referred to as glycerol. Although glycerin is the preferred alcohol for use in connection with the present invention, alternative alcohols such as other glycerols (i.e., other trihydric alcohols and also including polyhydric alcohols) and glycols (i.e., dihydric alcohols) can also be employed. Glycerin has a hygroscopic nature and may comprise a small amount of water, e.g., about 4 percent. In certain instances, it is advantageous to include an amount of added water in the liquid.

As used herein, the term "silicone oil" refers to a silicone-based polymer with substantially no cross-linking. Such a polymer has substantially no memory or is breakable with a relatively low shearing force. Silicone oil can be distinguished from silicone gel in that silicone gel has memory. One example of a silicone oil is FL200, available from Dow Corning Corporation, Midland, Mich.

As used herein, the term "wax and oil" or "wax/oil" refers to a combination of wax and oil such that the wax and oil component present in the composition preferably has a density of from about 0.5 to about 1.0 g/cc, or, more preferably, from about 0.75 to about 0.90 g/cc. When wax/oil compositions are utilized, the wax preferably ranges in an amount from about 40 weight percent to about 69.3 weight percent, while the oil preferably ranges from about 1.7 weight percent to about 30 weight percent. If beads are utilized in the wax/oil composition, the beads are preferably present in an amount less than about 30 weight percent. However, in certain flowable material compositions the amount of beads may be significantly higher (e.g., 10% oil and 90% acrylonitrile, polyvinylidene-dichloride, or phenolic beads as discussed further below).

The wax component, for example, can be a suitable natural, mineral, petroleum-based synthetic, vegetable, or animal wax including insect wax such as beeswax [for example, SC 10979 beeswax (yellow), available from Sargent-Welch Scientific Co., Skokie, Ill.], paraffin wax, microcrystalline wax or paraffin-based waxes. The added or separate oil component of the material may be a suitable natural, synthetic, vegetable, mineral (including petroleum-derived oils), or petroleum-based oil (for example, neutral blending or bright stock).

In order to facilitate control of the flow characteristics of a finished wax/oil material, it is important to avoid the use of unsaturated natural or vegetable drying or semi-drying oils that are unsaturated in such a manner or to such a level as to oxidize, thicken or harden significantly (e.g., polymerize or cross-link) with time or conditions of storage or use, which in many instances is reflected by the oil having an excessively high or unsatisfactory iodine number.

With regard to flowable material compositions in accordance with the principles of the present invention, as noted above some of such compositions may be glycerin-containing and silicone oil-containing compositions which incorporate certain viscosity-increasing agents. The process for producing the glycerin-containing or silicone oil-containing compositions generally involves mixing the liquid, viscosity-increasing agent, and, if desired, the flame retardant until a homogenous mixture is achieved. Preferably, spherical particles can also be included. The specific process for producing compositions in accordance with the present invention will vary slightly depending upon the liquid and viscosity-increasing agent employed. For example, one process is preferably employed when guar, agar, carboxymethylcellulose ("CMC"), hydroxypropylcellulose, hydroxyethylcellulose ("HEC") and/or polyethyleneoxide (hereinafter collectively referred to as "organic viscosity-increasing agents") are employed. A slightly different process is employed when fumed silica and/or attapulgite or bentonite clays (hereinafter collectively referred to as "mineral viscosity-increasing agents") are employed. When the organic viscosity-increasing agents are employed, the pH of the composition can be adjusted in order to control the rate in which the viscosity of the fluid increases, i.e. the "viscosity buildup" rate. Generally, if the pH is lowered, the viscosity buildup will proceed at a slower rate as when using CMC's, HEC's or cellulosic thickeners. A low pH is also advantageous when using certain preservatives in the composition.

The viscosity-increasing agent is a material which, when mixed with the liquid, increases the viscosity of the liquid. Preferred organic viscosity-increasing agents for use with the present composition include gums, cellulose-based materials and other polymers. Preferred viscosity-increasing agents of this type include guar, agar, hydroxyethylcellulose, carboxymethylcellulose, hydroxypropylcellulose and polyethyleneoxide. Another organic viscosity-increasing material is a pulp marketed under the trademark "Kevlar" and it may be desirable for use in flowable material compositions of the present invention since it may impart a further degree of flame retardancy since it is itself non-flammable. Preferably, the organic viscosity-increasing agent is present in an amount from about 0.5 weight percent to about 10 weight percent, and more preferably from about 1 weight percent to about 6 weight percent, and most preferably from about 1.2 weight percent to about 4 weight percent, based on the total composition weight.

Hydroxyethylcellulose, carboxymethylcellulose and hydroxypropylcellulose, as well as other cellulose-based materials, are available from Aqualon Company of Wilmington, Del. Carboxymethylcellulose is described in a report entitled "Aqualon (TM) Cellulose Gum, Sodium Carboxylmethylcellulose, Physical and Chemical Properties" copyright 1988, available from Aqualon Company. Hydroxyethylcellulose is described in a report entitled "Natrosol (TM), Hydroxyethylcellulose, A Non-Ionic Water-Soluble Polymer, Physical and Chemical Properties," revised July 1987, available from Aqualon Company. Both of these Aqualon publications are incorporated herein by reference in their entirety.

When using organic viscosity-increasing agents such as hydroxyethylcellulose, it is preferable that the organic material does not include a hydrolyzing retardant layer on its surface, as many commercially available brands do. A hydrolyzing retardant layer slows down the viscosity-increasing process. When glycerin is utilized in the composition, the process can become too slow to be practical.

The preferred liquids for use together with organic viscosity-increasing agents in the present composition include water and glycerin. An important advantage gained from the use of water is that it increases the flame retardancy of the composition. An important advantage gained from the use of glycerin is that it lowers the freezing point of the liquid. Additionally, another important advantage gained from the use of glycerin is that it is much easier to contain within a resinous package, because glycerin is much less likely to evaporate through the resinous material than is water. An additional advantage gained from the use of glycerin with organic viscosity-increasing agent is that it provides a "viscosity bonus effect", described below When utilizing organic viscosity increasing agents, the glycerin is preferably present in an amount in the range of from about 42 weight percent to about 74 weight percent based on the total composition, more preferably in an amount from about 57 weight percent to about 69 weight percent of the total composition. Water is preferably present in an amount in the range from about 1 weight percent to about 8 weight percent based on the total composition, more preferably in an amount from about 2 weight percent to about 6 weight percent of the total composition.

The behavior of some viscosity-increasing agents, such as highly substituted carboxymethylcellulose, in mixed-solvent systems, such as glycerin/water, is similar to its behavior in water alone. However, in mixed systems, the viscosity of the solvent affects the viscosity of the solution. For example, if a 60:40 mixture of glycerin and water (which is 10 times as viscous as water alone) is used as the solvent, the resulting solution of well-dispersed carboxymethylcellulose will be ten times as viscous as the comparable solution in water alone. This behavior is commonly referred to as the "viscosity bonus effect."

The total liquid content in the organic viscosity-increasing agent composition is preferably in the range of from about 50 weight percent to about 76 weight percent based on the total composition weight, and is more preferably present in an amount from about 60 weight percent to about 70 weight percent.

The organic viscosity-increasing agent containing composition is preferably produced by initially mixing the organic viscosity-increasing agent and glycerin. This slurry can then be mixed with water and the remainder of the ingredients. Preferably the mixing is accomplished in a blender using an emulsifier or homogenization head. As will be appreciated by those skilled in the art, other mixing techniques can be employed.

In addition to organic viscosity-increasing agents, it is possible to use mineral viscosity-increasing agents in flowable material compositions of the present invention. Preferred mineral viscosity-increasing agents include fumed silica, such as Cab-O-Sil M5 ™, available from the Cabot Corporation of Tuscola, Ill., attapulgite clays, such as Attagel 40 ™ or Attagel 50 ™, both available from the Englehard Corporation of Attapulgus, Ga., and bentonite, such as Baragel 3000 or Bentone LT, available from Rheox, Inc. of Hightstown, N.J. Advantages of some mineral viscosity-increasing agents in general include: the agents can be used with glycerin or silicone oil alone, without any need to employ water; the composition can be sealed within a resinous package using heat-sealing or RF sealing techniques which provide good clean seals; and the materials, particularly attapulgite clays, are relatively inexpensive. The advantage of using glycerin or silicone oil alone, with no added water, is that a composition is obtained having a very low freezing point and in addition, it is much easier to contain such liquids within a resinous package. Additionally, it has been found that mineral viscosity-increasing agents, particularly attapulgite clay, have relatively stable viscosity characteristics over a wide range of temperatures and are not prone to separating during use.

The mineral viscosity-increasing agents are preferably present in an amount from about 2 weight percent to about 30 weight percent, based on the total composition weight. More preferably the mineral agents comprise from about 3 weight percent to about 20 weight percent of the total composition weight, and most preferably from about 4 weight percent to about 15 weight percent of the total composition weight. Silicone oil or glycerin employed in connection with the mineral viscosity-increasing agents is preferably present in an amount from about 25 weight percent to about 75 weight percent, and more preferably in an amount from about 50 weight percent to about 74 weight percent, based on the total composition weight. When fumed silica is employed, as well as attapulgite and/or bentonite clays, it may be preferable to also employ a surfactant, e.g. Triton X-100 ™ available from Rohm & Haas, Philadelphia, Pa. 19105 and in an amount ranging from about 1% to about 5% of the total weight of the composition. However, any surfactant with the suitable hydrolyphic balance which lends itself to thickening the liquid being used (e.g., oil, glycerin, polyhydroxyl alcohols, silicone, flame retardants), which may or may not incorporate water in their formulations in either a free or emulsified state, may be utilized.

When mixing the mineral viscosity-increasing agents with the glycerin or silicone oil, it is preferable to mix a portion of the glycerin or silicone oil with the mineral viscosity-increasing agents to form an initial slurry and then add the rest of the materials. The mixing can be accomplished using a blender with an emulsifier or a homogenization head. Alternatively, all of the materials may be mixed together at once.

All of the viscosity-increasing agents associated with the present invention have the important characteristic of increasing the viscosity of a fluid, while still permitting the fluid to flow. The typical composition of the present invention is flowable and does not have total memory. In other words, once deformed, it will not always return to its original shape. However, some compositions in accordance with the present invention can exhibit a small degree of gel strength. The gel structure can be broken merely by applying a small but sufficient force.

The compositions of the present invention are non-Newtonian, because their viscosities change when the shear rate changes. In other words, the ratio of shear rate (flow) to shear stress (force) is not constant. The compositions are typically either pseudoplastic or thixotropic. A pseudoplastic composition is one which appears to have a yield stress beyond which flow commences and increases sharply with an increase in stress. In practice, the compositions exhibit flow at all shear stresses, although the ratio of flow to force increases negligibly until the force exceeds the apparent yield stress. The flow rate of a thixotropic substance increases with increasing duration of agitation as well as with increased shear stress. In other words, the flow rate is time dependent. When agitation is stopped, internal shear stress can exhibit hysteresis. Upon re-agitation, less force is generally required to create a given flow than is required for the first agitation. The fact that the present materials flow more readily when higher shear stress is applied is advantageous in a number of applications.

The beads or particles preferably employed in the present invention are preferably spherical and hollow to lessen their density and lighten the overall weight of the flowable, pressure-compensating composition, or, if desired, can be solid or cellular. Expandable microbeads, as described in U.S. Pat. Nos. 4,243,754, 4,108,928, and 4,038,762 can also be employed.

The beads/particles may be made from a number of suitable materials including for example silica glass, saran polymer, phenolic resin and carbon. More generally, the beads/particles may be "resinous" that is formed from various "plastic" materials. Detailed descriptions of suitable beads/particles can be found in the flowable, pressure-compensating material patents, described hereinabove and incorporated herein by reference in their entirety. Glass beads are preferred in certain applications because of their relatively low cost. When higher bead strength is desired, plastic, phenolic resin, ceramic, or carbon beads are preferred. Acrylonitrile and/or polyvinylidene dichloride beads or balloons have the advantage of low weight and high resistance to shear as well as high hydrostatic strength.

When used in compositions where a low total weight is desired, the beads/particles are preferably within the size range of from about 10 micrometers to about 300 micrometers in diameter. The density of spherical particles can be, for example, from about 0.05 to about 0.70 grams per cubic centimeter. More particularly, glass spherical particles preferably have a density of from about 0.23 grams per cubic centimeter to about 0.37 grams per cubic centimeter and phenolic resin spherical particles preferably have a density of about 0.15 grams per cubic centimeter.

Specific examples of suitable spherical particles include "3M Glass Bubbles" available from 3M, St. Paul, Minn., and "Microballoons" available from Union Carbide Specialty Chemicals Division, Danbury, Conn.

Generally, spherical particles are preferably present in an amount from about 0.01 to about 32 weight percent based on the total composition weight, and more preferably in an amount from about 15 to about 31 weight percent and still more preferably in amount from about 25 weight percent to about 30 weight percent.

The spherical particles of the present composition perform at least two important functions. First, the size, shape and quantity of the spherical particles influence the flow characteristics of the composition. Therefore, a composition can be tailored to have the desired flow characteristics by selecting the appropriate size, shape and amount of particles. Second, because of particle-to-particle contact, the spherical particles can enhance the distribution of loads placed on flexible packages containing the present composition.

Another advantage of the spherical particles employed in the present invention is that they permit a degree of weight control. For example, in most applications, the composition should weigh as little as possible. In such instances, lightweight hollow particles are preferred, in order to lower the overall density of the composition. However, in some applications a heavier composition is desired. Examples of such applications include weight belts to be strapped around parts of a person's body (e.g., wrist and ankle weights) and padding devices where it is desired that the device's own weight hold it firmly in place. When heavy compositions are desired, solid particles comprising dense materials are preferred. In such applications, particles greater than 300 micrometers in diameter can be used effectively.

When employed in padding devices, the flowable, pressure-compensating composition is generally enclosed within a flexible, protective enclosure with a predetermined volume of the composition retained therein. Preferably, the enclosure is formed of suitable flexible material and desirably is a pliable, thermoplastic, resinous film that can be heat-sealed after the composition is inserted therewithin. Because of their relatively low cost and desirable strength and flexibility characteristics, polyurethane and polyvinylchloride materials are preferred for use as the enclosure film. Polyvinyl chloride material provides the further advantage of being flame retardant/nonflammable to a certain degree. Knit weave fabric such as aramid fibers marketed under the trademark "Nomex" may be used to form a cover which may be positioned over the flowable material-containing envelope structure to provide and/or enhance flame retardancy. Moreover, certain barrier films may be utilized.

As noted above, an alternative to achieving flame retardancy relating to the use of flowable material compositions in human anatomy padding applications is to utilize an enclosure formed from a material containing a halogen in combination with a synergistic flame retardant/ smoke suppressant As used herein, "synergistic flame retardant/smoke suppressant" means the combination of a flame retardant material (e.g., halogenated material) and a synergist (e.g., antimony oxide) in a given proportion to give rise to a degree of flame retardancy which would exceed that degree of flame retardancy if either was used alone. Examples of appropriate enclosure materials containing halogens for this type of flame retardancy include PVC, halogenated TPE (thermoplastic elastomers). Appropriate synergistic flame retardants include antimony oxide and zinc stannate. One particularly desirable combination includes an enclosure material formed from PVC in combination with zinc stannate as a synergistic flame retardant/smoke suppressant.

The flowable material compositions are initially distributed substantially uniformly throughout the confines of the enclosure, which is typically provided by sealing (e.g., heat sealing, RF sealing) the film along the marginal edges. If desired, one can choose to seal the protective enclosure for the composition, but leave a small vent opening and a small filling port, so that a predetermined volume of the flowable composition may be injected into the enclosure through the filling port, followed by sealing both the vent opening and the filling port (e.g., by heat or using RF energy). Alternatively, the composition may be placed on one sheet, a second sheet may be placed over the composition, and the outer edges sealed. As can be appreciated, internal sealing lines can also be formed to compartmentalize the composition within the enclosure.

One of the advantages of using mineral viscosity-increasing agents such as fumed silica or attapulgite clays as the viscosity-increasing agent, is that the sealability of the film package may be improved. When using cellulose based materials as the viscosity-increasing agent, such as hydroxyethylcellulose, or when using certain bentonite clays (e.g., Baragel 3000), the composition may "plate-out" and contaminate the seal.

The desired final viscosity of the composition can be selected to suit a wide variety of applications. Some applications require high viscosity compositions and others require compositions of much lower viscosity. For use in padding devices, viscosities in the range of from about 30,000 centipoise to about 1,000,000 centipoise are preferred. When the viscosity exceeds 1,000,000 centipoise, the composition is often so viscous that it is difficult to mix and striation of the composition may occur.

In compositions containing water, the viscosity may generally provided by hydrogen bonding between water and the viscosity-increasing agents. This hydrogen bonding is generally sufficient to keep the spherical particles dispersed throughout the composition. In prior art materials, such as a silicone gel disclosed in U.S. Pat. No. 4,380,569, cross-linking reactions were believed necessary to prevent the microbeads from floating out.

In a preferred embodiment of the present invention, steps can be taken in order to prevent or at least inhibit microbiological attack and chemical degradation of the present compositions. For example, radiation sterilization can be performed. Preferably, the composition is subjected to radiation such as x-ray radiation or gamma radiation in order to destroy microorganisms present in the composition. An advantage of radiation treatment is that it can be performed after the composition has been placed in a package, such as between pliable sheets of resinous material.

An alternative method useful in preventing/inhibiting microbiological attack is the use of a heat sterilization step. For example, a padding device comprising the present composition placed in a polyvinylchloride package can be heated to about 180° F. for more than about 30 minutes, preferably between about 30 and 45 minutes. Preferably, this method is employed in an autoclave having a nitrogen atmosphere.

Alternatively, additives can be added to the composition in order to inhibit microbiological attack and chemical degradation. Examples of suitable preservatives include formaldehyde, methyl- and propylparabens, phenol, phenylmercuric salts, sodium benzoate, sodium propionate, sorbic acid and sorbates (sodium and potassium salts). Additionally, proprietary preservatives such as Busan 11 ml, 85 available from Buckman Laboratory, Dowicide A and Dowicil 75, 200 available from The Dow Chemical Company, Proxel GXL and CRL available from ICI Americas Inc., Merbac 35 and Tektamer 38 available from Merck/Calgon Corporation, Thimerosal available from Eli Lilly and Company and Vancide TH available from R. T. Vanderbilt Co., Inc. can be used.

In order to function properly, certain preservatives (e.g. benzoates and sorbates) require a low pH, i.e., acidic, environment. This can be achieved by adding an acid, e.g. citric acid to the composition. Citric and/or other desirable acid is added in an amount sufficient to lower the pH to a range of about pH 4 to about pH 6 and preferably about pH 4.5 to about pH 5.5. In certain instances, such as when silica glass particles are employed, the silica will raise the pH of the system. Therefore, more acid is generally necessary to achieve the desired pH range than for a composition not having silica particles. Preferably from about 0.1 weight percent to about 0.5 weight percent benzoate or sorbate is included in the present compositions based on the total composition weight.

In accordance with the present invention, a process for producing the silicone oil- or glycerine-containing compositions is provided. A preferred embodiment of the process includes an initial step of producing two slurries. For example, a first slurry of a mineral viscosity-increasing agent and silicone oil or glycerin or a first slurry of organic viscosity-increasing agent and glycerin, and possibly silicone oil, can be provided. A second slurry, comprising more liquid, e.g. glycerin and/or water or silicone oil, and the spherical particles, is then provided. Additives such as acid, preservatives and flame retardants can also be mixed with this second slurry. At the appropriate time, the two slurries are mixed together. Alternatively, all the components may be mixed together at one time. Mixing can take place in mechanical mixers such as blenders available from Lightnin and Waring. Alternatively, static mixing devices such as those available from Chemix and from Lightnin can be used.

The mixing of flowable material compositions may also include mixing the liquid and thickener (e.g., glycerin and attapulgite, oil and fumed silica) into a relatively thick or viscous slurry with a homogenization head or a "Cowles" dissolver. The slurry may then be thinned with the liquid being utilized and the beads may be added. Final mixing may be done with a paddle mixer or the like.

As explained hereinbefore, it can be advantageous to lower the pH of the compositions to a range of about pH 4 to about pH 6. One reason for this is that the rate of viscosity buildup is slower at lower pH's for organic viscosity-increasing agents. This provides a greater amount of time for working with the composition before it fully sets up. For example, when the composition is placed in an enclosure, it is advantageous if the composition maintains a low viscosity for a period of time to allow its insertion into the enclosure. The viscosity buildup rate can also be slowed by using a low temperature liquid and/or by the use of chemical retardants. Alternatively, excess water can initially be employed to lower the viscosity. After the composition is placed in the enclosure, excess water can be allowed to evaporate until the desired viscosity is attained.

EXAMPLE NO. 1

Compositions were prepared containing the following materials:

| Weight Percent | Material |
| --- | --- |
| Composition No. 1 | |
| 3.9 | Attapulgite Clay (Attagel 50 TM available from Englehard Corporation) |
| 58.1 | Glycerin |
| 28.0 | Spherical particles (B-37 designation for Glass Bubbles available from 3M) |
| 10.0 | Bicarbonate of Soda (NaHCO$_3$) |
| Actual Weight (Pounds) | Material |
| Composition No. 2 | |
| 3.4 | Glycerin |
| 0.2 | Attapulgite Clay |
| 1.7 | Spherical particles (B-37 for Glass Bubbles from 3M) |
| 0.6 | Bicarbonate of Soda (NaHCO$_3$) |

Alternatively, epsom salt (MgSO$_4$.7H$_2$O) can be substituted for bicarbonate of soda in the above compositions. Both of these formulations survived in air aspirated butane torch flame for 20 seconds without burning. Both compositions self-extinguished.

| Weight Percent | Material |
| --- | --- |
| Composition No. 3 | |
| 75 | Silicone Oil (FL200 from Dow Corning Corporation) |
| 25 | Spherical particles (B-37 for Glass Bubbles from 3M) |

If desired, a flame retardant and/or a viscosity-increasing material, preferably a mineral viscosity-increasing material, can be included in Composition 3 of Example 1.

In addition to the above-identified aspect of the present invention of flame retardancy, another aspect of the present invention relates to improving upon the maintenance of homogeneity of the flowable material composition over a defined period of time/use. Generally, it is desirable for the various constituents utilized in flowable material compositions to not float and/or settle from remaining portions thereof over an acceptable period of time. One way in which the present invention improves upon maintaining a desired distribution is to utilize various coupling agents in the compositions. As used herein, the phrase "coupling agent(s)" therefore means any constituent of a flowable material composition which, through some type of bonding and/or interaction with another portion of the flowable material composition, reduces the tendency for separation of one or more constituents of the flowable material composition.

One composition of a flowable material in accordance with the above generally includes a liquid, a viscosity-increasing material such as clay and/or fumed silica, and a plurality of beads having a preselected coating thereon and which have a density which is different (typically less) than that of both the liquid and the clay. Based on this difference in density, the potential exists that the beads will float/separate out from remaining portions of the composition. However, the coating on the beads allows for/establishes for a "bonding" or coupling effect with the liquid and/or the viscosity-increasing material, and thus functions as the coupling agent. Therefore, the potential for the beads floating out of or otherwise separating from the composition, due to their density in comparison to the liquid and clay, is reduced.

In the above-identified composition, the incorporation of a viscosity-increasing component has a viscosity-increasing effect. This may be attributed to the surface area of the individual particles of the viscosity-increasing material within the liquid and/or a natural affinity between the viscosity-increasing material and the liquid (e.g., a polar attraction). In the event that the viscosity-increasing material and liquid have no natural attraction, it may be desirable to incorporate an appropriate surfactant to provide for a coupling of the viscosity increasing material and liquid, which would thus further increase the viscosity of the flowable material composition if such is desired.

Appropriate liquids for the above-identified composition include various oils, preferably mineral oils and more preferably petroleum-derived oils, glycerin-containing solution such as glycerin/water solutions, polyhydroxyl alcohol-containing solutions, and appropriate mixtures thereof. Depending upon the application and/or other circumstances, it may be desirable for the liquid to be all oil or all glycerin, or for the liquid to include other constituents therein (e.g., using an oil/wax combination or a glycerin/water combination as noted above). Appropriate viscosity-increasing materials includes clays such as attapulgites (e.g., Attagel 40 TM or Attagel 50 TM), bentonites (e.g., Bentone LT), and fumed silica (e.g., Cab-O-Sil M5 TM). Appropriate beads include M6017AE beads available from Pierce & Stevens Corp., Buffalo, N.Y. 14240-9990 (e.g., an acrylonitrile bead having a calcium carbonate coating thereon) and M6001AE beads available from Pierce & Stevens Corp. (e.g., a polyvinylidene-dichloride bead also having a calcium carbonate coating thereon).

Various combinations of the above-identified types of constituents used in a flowable material composition with beads having the preselected coating thereon are provided in Example No. 2 below.

EXAMPLE NO. 2

| Material | General Volume % Range | Preferred Volume % Range |
|---|---|---|
| Composition No. 4 | | |
| Attapulgite Clay (Attagel 40 TM or 50 TM) | 1% to 30% | 5% to 15% |
| Glycerin (95%–99.9% pure) | 10% to 90% | 60% to 75% |
| Beads (M6001AE, M6017AE) | 10% to 90% | 25% to 66% |
| Composition No. 5 | | |
| Fumed Silica (Cab-O-Sil M5 TM) | 1% to 20% | 5% to 15% |
| 100 PT naphthenic-based oil | 10% to 90% | 60% to 75% |
| Beads (M6001AE, M6017AE) | 10% to 90% | 25% to 66% |
| Composition No. 6 | | |
| Bentonite (Bentone LT) | 1% to 30% | 1% to 10% |
| Glycerin (95%–99.9% pure) | 10% to 90% | 60% to 75% |
| Beads (M6001AE, M6017AE) | 10% to 90% | 1% to 66% |

As noted above, in the case of using certain mineral viscosity-increasing agents with beads having a calcium carbonate coating thereon, a hydrogen bonding between the carbonate coating thereon, a hydrogen bonding between the agent and/or liquid and the beads is believed to exist. For instance, in the case when Baragel 3000 is used with oil, a surfactant is implanted into the surface of the bentonite in the form of a quarternary ammonium salt. The hydrogen bonding along the edge of the bentonite platelets coupled with the surfactant (quarternary ammonium salt) on the surface of the bentonite platelets hydrogen bonds with the $H_2O$ on the calcium carbonate on, for instance, the M6001AE and M6017AE beads to retain such within the composition. This phenomenon is also believed to exist to a degree when utilizing: attapulgite, glycerin and M6001AE/M6017AE beads; bentonite (e.g., Bentone LT which is not surface treated), glycerin, and M6001AE/M6017AE beads; or fumed silica, glycerin, and M6001AE/M6017AE beads.

In order to illustrate the effect of using the calcium carbonate coating on the beads, one mixture of oil, Baragel 3000, and glass beads (no calcium carbonate coating) was compared to a mixture of oil, Baragel 3000, and M6001AE/M6017AE beads with the calcium carbonate coating thereon. Although the M6001AE and M6017AE beads have a lower specific gravity than the glass beads (0.13 g/cc versus 0.37 g/cc), the M6001AE and M6017AE beads appeared to float out much less or not at all in extreme temperature oven tests (e.g., exposure to a temperature of about 0° F. to 185° F. for a time ranging from about 0 months to about 3 months) in comparison to the glass beads.

Generally with regard to the flowable materials of Compositions 4–6 above, the viscosity of the flowable material may range from about 10,000 centipoise to about 1,000,000 centipoise. In the case where oil is the only liquid in the compositions, its individual viscosity may range from about 40 centipoise to about 400 centipoise to yield a viscosity of about 10,000 centipoise to about 1,000,000 centipoise for the flowable material composition.

Another way in which homogeneity may be improved/maintained in flowable material compositions is to incorporate an appropriate surfactant. In some cases, there may not be any bonding-like interaction/attraction between the particular liquid and viscosity-increasing material. The surfactant allows for a coupling of the liquid and/or viscosity-increasing material and/or beads if used. Consequently, the viscosity of the composition may also be increased by adding the surfactant in these instances as well. In this case and depending upon the application, it may be desirable to also include beads within the flowable material composition. For instance, the above-identified beads having the preselected coating thereon to function as a coupling agent may be utilized. However, other types of beads may be utilized such as the B-37, K-37, K-20, S-32 and/or B-23 beads from 3M Corporation (e.g., hollow glass beads). Various combinations of constituents incorporating surfactants and which are particularly desirable for human anatomy padding applications are provided in Example No. 3 below:

EXAMPLE NO. 3

| Material | General Volume % Range | Preferred Volume % Range |
|---|---|---|
| Composition No. 7 | | |
| Attapulgite Clay (Attagel 40 TM or 50 TM) | 1% to 30% | 1% to 15% |
| 100 PT Motor Oil | 25% to 90% | 50% to 75% |
| Beads (K-37, K-20, | 1% to 90% | 5% to 66% |

| Material | General Volume % Range | Preferred Volume % Range |
| --- | --- | --- |
| M6001AE, M6017AE) Surfactant (Triton X-100 TM) | 1% to 10% | 1% to 2% |
| Composition No. 8 | | |
| Fumed Silica (Cab-O-Sil M5 TM) | 1% to 20% | 1% to 5% |
| Glycerin 95%-99.9% pure) | 25% to 90% | 50% to 75% |
| Beads (K-37, K-20, M6001AE, M6017AE) | 1% to 90% | 5% to 66% |
| Surfactant (Triton X-100 TM) | 1% to 10% | 1% to 2% |

Another combination includes surface treated bentonite (e.g., Baragel 3000 which is a bentonite clay surface treated with quartenary ammonium salt), 100 point motor oil and beads (e.g., K-37, K-20, M6001AE, Md6017AE). In these cases, the use of the M6000A-E/M6017AE beads having the calcium carbonate coating thereon may hydrogen bond to the viscosity enhancer and/or the liquid. For instance, there may be hydrogen-bonding in a composition of attapulgite, oil, M6001AE/M6017AE beads and a surfactant between the surfactant, the water on the calcium carbonate coating, and the oil.

Generally, with regard to Compositions 7-8 above for flowable materials in accordance with the present invention, the viscosity may range from about 10,000 centipoise to about 1,000,000 centipoise. In the event that such compositions did not include the surfactant, the viscosity would range from about 50 centipoise to about 100,000 centipoise. Therefore, under some circumstances the viscosity of the flowable material can be significantly increased.

Although the above-identified combinations of constituents for flowable material compositions in accordance with the present invention have one or more desirable characteristics, other combinations may suitably perform. In this case, the following general ranges of constituents may be employed:

| Material | General Volume % Range |
| --- | --- |
| Bentonites (e.g., Baragel 3000) | 1% to 20% |
| Attapulgite Clays (e.g., Attagel 40 TM, 50 TM) | 1% to 35% |
| Fumed Silica (e.g., Cab-O-Sil M5 TM) | 1% to 20% |
| M6017AE Beads | 0% to 100% |
| B-37/K-37 Beads | 0% to 100% |
| Surfactants (e.g., Triton X-100 TM) | 1% to 10% |
| Glycerin | 0% to 100% |
| Oil | 0% to 100% |
| Flame Retardant Additives | 1% to 20% |
| Flame Retardant Base Liquid | 0% to 100% |

Figure 2:
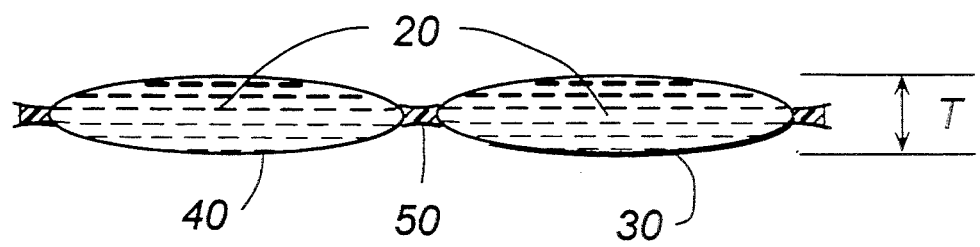
FIG. 2 is a cross-sectional of the enclosure of FIG. 1 taken along line 2—2.
Figure 3:
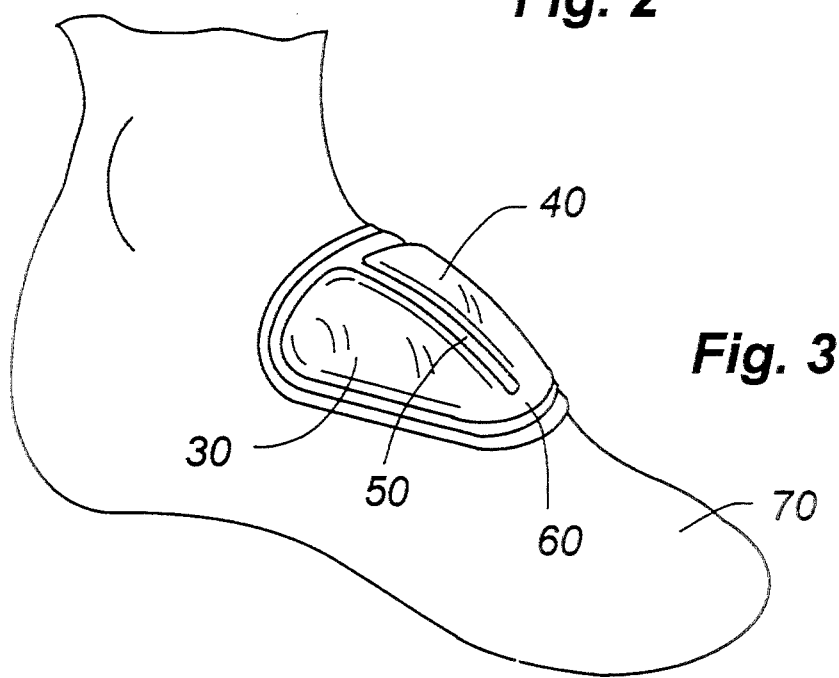
FIG. 3 is a perspective view of the enclosure of FIG. 1 when positioned on a user's instep.

As noted above, one of the primary applications for flowable materials of the type described herein are for use in human anatomy padding applications. Referring to FIGS. 1-3, a padding device 10 incorporating a flowable material 20 of the present invention is generally illustrated therein. The padding device 10 is a substantially pliable enclosure generally of the above-identified type and is specifically configured for use as a tongue padding device in combination with footwear. In this regard, the padding device 10 includes first and second chambers 30, 40 which are separated by a barrier 50 and fluidly interconnected by a passageway 60. Consequently, the padding device 10 effectively pivots about the central axis of the instep of the foot 70 of a user when positioned thereon such that the first and second chambers 30, 40 are positioned on opposite sides of the instep.

In order to enhance the distribution of the forces applied to the padding device 10, such as those forces applied by the tightening of shoe laces or velcro straps (not shown), the dimensions of the padding device and/or the amount of flowable material 20 contained therein are specifically selected. Generally, it is desirable for the shoe laces/velcro straps to bridge across the barrier 50 such that all forces applied by such laces/straps are communicated to the foot 70 through the flowable material 20 within the chambers 30, 40. This maximizes the distribution of such forces across the foot 70. Moreover, it is preferable to avoid any bottoming out when the force is applied to the device 10 (e.g., a total migration of flowable material 20 away from an area coinciding with an applied force).

With regard to the dimensions of the padding device 10 and as illustrated in FIG. 1, in one embodiment the length "$L_1$" of each chamber 30, 40 ranges from about 2" to about 5" and is preferably about 3½"; the width $W_1$ of the widest end of each chamber 30, 40 ranges from about 1" to about 2" and is preferably about 1"; the width $W_2$ if the narrowest end of each chamber 30, 40 ranges from about ¼" to about 1" and is preferably about ½"; the width "$W_3$" of the barrier 50 ranges from about 1/16" to about ¼" and is preferably about ⅛"; the length "$L_2$" of the barrier 50 ranges from about 1" to about 3" and is preferably about 2"; and the thickness "T" of each chamber 30, 40 ranges from about 1/16" to about ¼" and is preferably about ⅛". Moreover, a flowable material of any one of the above-described compositions of the present invention may be incorporated in an amount ranging from about to 10 cubic centimeters to about 30 cubic centimeters, and preferably about 15 cubic centimeters.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A flowable, pressure-compensating material, comprising:
    a liquid;
    a viscosity-increasing material selected from the group consisting of clay, fumed silica, and mixtures thereof; and
    a plurality of beads having a coating on an exterior surface of said beads, having a density which is different than a density of both said liquid and said viscosity-increasing material, and being distributed substantially throughout said flowable material, whereby said preselected coating provides for a coupling interaction with at least one of said liquid and said viscosity-increasing material to reduce a potential for said beads separating from remaining portions of said flowable material.

2. A flowable material, as claimed in claim 1, wherein:

said liquid consists essentially of a mineral oil.

3. A flowable material, as claimed in claim 2, wherein:
said mineral oil comprises a petroleum-derived oil.

4. A flowable material, as claimed in claim 2, wherein:
said mineral oil has a viscosity ranging from about 40 centipoise to about 400 centipoise.

5. A flowable material, as claimed in claim 1, wherein:
said liquid is selected from the group consisting of a petroleum-derived oil and a polyhydroxyl alcohol-containing solution.

6. A flowable material, as claimed in claim 1, wherein:
said viscosity-increasing material is selected from the group consisting of attapulgite, said fumed silica, bentonite, and mixtures thereof.

7. A flowable material, as claimed in claim 3, wherein:
said viscosity-increasing material consists of said fumed silica.

8. A flowable material, as claimed in claim 1, wherein:
said viscosity-increasing material is selected from the group consisting of attapulgite, bentonite, and mixtures thereof, said liquid is selected from the group consisting of a glycerin-containing solution, said coating on said beads comprises calcium carbonate.

9. A flowable material, as claimed in claim 1, wherein:
said beads are substantially hollow and formed from a resinous material, said coating on said beads comprising calcium carbonate.

10. A flowable material, as claimed in claim 1, further comprising:
a flame retardant.

11. A flowable material, as claimed in claim 10, wherein:
said flame retardant is selected from the group consisting of boric oxide, borax, boric acid, bicarbonate of soda, epsom salt, alumina trihydrate, chloroparaffins, chlorinated polyethylenes, halogens, brominated phthalate solution, hydrated calcium carbonate, phosphonate esters, and mixtures thereof.

12. A flowable material, as claimed in claim 1, further comprising:
a surfactant.

13. A flowable material, as claimed in claim 12, wherein:
said surfactant has a hydrolyphic balance suited for thickening said liquid.

14. A flowable material, as claimed in claim 1, wherein:
said liquid is selected from the group consisting of a petroleum-derived oil, a polyhydroxyl alcohol-containing solution, and mixtures thereof, and in an amount ranging from about 10 volume percent to about 90 volume percent based upon the total composition volume;
said viscosity-increasing material is selected from the group consisting of attapulgite, said fumed silica, bentonite, and mixtures thereof and in an amount ranging from about 1 volume percent to about 25 volume percent based upon the total composition volume; and said beads are formed from a resinous material having a calcium carbonate coating thereon and are present in an amount ranging from about 1 volume percent to about 90 volume percent based upon the total composition volume.

15. A flowable material, as claimed in claim 1, wherein:
said beads remain substantially distributed throughout said flowable material when exposed to a temperature ranging from about 0° F. to about 185° F. for a time ranging from about 0 months to about 3 months.

16. A flowable, pressure-compensating material, comprising:
a liquid;
bentonite; and
a plurality of beads.

17. A flowable material, as claimed in claim 16, wherein:
said liquid consists essentially of a mineral oil.

18. A flowable material, as claimed in claim 17, wherein:
said mineral oil comprises a petroleum-derived oil.

19. A flowable material, as claimed in claim 17, wherein:
said mineral oil has a viscosity ranging from about 40 centipoise to about 400 centipoise.

20. A flowable material, as claimed in claim 16, wherein:
said liquid is selected from the group consisting of a petroleum-derived oil, a glycerin-containing solution, and mixtures thereof.

21. A flowable material, as claimed in claim 16, further comprising:
a flame retardant.

22. A flowable material, as claimed in claim 21, wherein:
said flame retardant is selected from the group consisting of boric oxide, borax, boric acid, bicarbonate of soda, epsom salt, alumina trihydrate, chloroparaffins, chlorinated polyethylenes, halogens, brominated phthalate esters, hydrated calcium carbonate, phosphonate esters, and mixtures thereof.

23. A flowable material, as claimed in claim 16, further comprising:
a surfactant.

24. A flowable material, as claimed in claim 23, wherein:
said surfactant has a hydrolyphic balance suited for thickening said liquid.

25. A flowable material, as claimed in claim 16, wherein:
said beads remain substantially distributed throughout said flowable material when exposed to a temperature ranging from about 0° F. to about 185° F. for a time ranging from about 0 months to about 3 months.

26. A flowable material, as claimed in claim 16, wherein:
said liquid is selected from the group consisting of a petroleum-derived oil, polyhydroxyl alcohol-containing solution, and mixtures thereof, and in an amount from about 10 volume percent to about 90 volume percent based upon the total composition volume;
said bentonite is present in an amount from about 1 volume percent to about 25 volume percent based upon the total composition volume; and said beads are present in an amount from about 1 volume percent to about 90 volume percent based upon the total composition volume.

27. A flowable, pressure-compensating material, comprising:
   a liquid selected from the group consisting of an oil-containing solution and a glycerin-containing solution;
   a viscosity-increasing material selected from the group consisting of attapulgite, fumed silica, bentonite, and mixtures thereof;
   a surfactant for dispersing said viscosity-increasing material throughout said liquid; and
   a plurality of beads.

28. A flowable material, as claimed in claim 27, wherein:
   said liquid consists of said oil-containing solution and said viscosity-increasing material is selected from the group consisting of said attapulgite and said bentonite.

29. A flowable material, as claimed in claim 27, wherein:
   said liquid consists of said glycerin-containing solution and said viscosity-increasing material is selected from the group consisting of said fumed silica, said bentonite, and mixtures thereof.

30. A flowable material, as claimed in claim 27, further comprising:
   a flame retardant.

31. A flowable material, as claimed in claim 30, wherein:
   said flame retardant is selected from the group consisting of boric oxide, borax, boric acid, bicarbonate of soda, epsom salt, alumina trihydrate, chloroparaffins, chlorinated polyethylenes, halogens, brominated phthalate esters, hydrated calcium carbonate, phosphonate esters, and mixtures thereof.

32. A flowable material, as claimed in claim 27, wherein:
   said liquid is present in an amount ranging from about 10 volume percent to about 90 volume percent based upon the total composition volume, said viscosity-increasing material is present in an amount ranging from about 1 volume percent to about 25 volume percent based upon the total composition volume, said surfactant is present in an amount ranging from about 1 volume percent to about 25 volume percent of said total composition volume, and said beads are present in an amount ranging from about 1 volume percent to about 90 volume percent of the total composition volume.

33. A flowable material, as claimed in claim 16, wherein:
   said liquid comprises silicone oil.

34. A flowable material, as claimed in claim 28, wherein:
   said oil-containing solution comprises silicone oil.

* * * * *